United States Patent
Huang et al.

(10) Patent No.: US 11,449,767 B2
(45) Date of Patent: Sep. 20, 2022

(54) METHOD OF BUILDING A SORTING MODEL, AND APPLICATION METHOD AND APPARATUS BASED ON THE MODEL

(71) Applicant: BAIDU ONLINE NETWORK TECHNOLOGY (BEIJING) CO., LTD., Beijing (CN)

(72) Inventors: Jizhou Huang, Beijing (CN); Wei Zhang, Beijing (CN); Shiqi Zhao, Beijing (CN); Shiqiang Ding, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 952 days.

(21) Appl. No.: 15/694,689

(22) Filed: Sep. 1, 2017

(65) Prior Publication Data

US 2018/0341866 A1 Nov. 29, 2018

(30) Foreign Application Priority Data

May 26, 2017 (CN) .......................... 201710385409.3

(51) Int. Cl.
*G06N 5/02* (2006.01)
*G06F 7/08* (2006.01)
(Continued)

(52) U.S. Cl.
CPC .............. *G06N 5/022* (2013.01); *G06F 7/08* (2013.01); *G06F 16/287* (2019.01);
(Continued)

(58) Field of Classification Search
CPC ....... G06F 7/08; G06F 16/24578; G06N 3/08; G06N 3/0445; G06N 16/287; G06N 16/3344; G06N 3/0454
See application file for complete search history.

(56) References Cited

U.S. PATENT DOCUMENTS 7,467,131 B1 * 12/2008 Gharachorloo ..... G06F 16/9574
2012/0030200 A1 2/2012 Yu et al.
(Continued)

FOREIGN PATENT DOCUMENTS

CN 104615767 A 5/2015
CN 104899322 A 9/2015
(Continued)

OTHER PUBLICATIONS

Shen et al., "A Latent Semantic Model with Convolutional-Pooling Structure for Information Retrieval," CIKM'14, Nov. 3-7, 2014, Shanghai, China (Year: 2014).*
(Continued)

*Primary Examiner* — Miranda M Huang
*Assistant Examiner* — Yao David Huang
(74) *Attorney, Agent, or Firm* — Ladas & Parry, LLP

(57) ABSTRACT

The present disclosure provides a method of building a sorting model, and an application method and apparatus based on the model. The method of building a sorting model comprises: obtaining, from a search log, a query including a relationship triple and a clicked title of a search result corresponding to the query, wherein the relationship triple includes a content word pair and a relationship word of the content word pair; obtaining training data using the obtained query, the clicked title corresponding to the query, and times of click of the clicked title; using the training data to train a neural network-based sorting model, the sorting model being used to sort sentences according to the sentences' description of a relationship of the content word pair. The sorting model may be used to implement the following applications: sorting the search results of the query comprising the relationship triple, determining the sentence describing the relationship of the content word pair; upon displaying the relevant content word with respect to the
(Continued)

query including the content word, the search engine can further display the sentence describing the relationship between the relevant content word and the searched content word.

27 Claims, 10 Drawing Sheets

(51) Int. Cl.
  *G06N 3/08* (2006.01)
  *G06F 16/33* (2019.01)
  *G06F 16/28* (2019.01)
  *G06N 3/04* (2006.01)

(52) U.S. Cl.
  CPC ....... *G06F 16/3344* (2019.01); *G06N 3/0454* (2013.01); *G06N 3/08* (2013.01); *G06N 3/0445* (2013.01)

(56) References Cited

U.S. PATENT DOCUMENTS

| | | | | |
|---|---|---|---|---|
| 2012/0246153 | A1* | 9/2012 | Pehle | G06F 16/3322 707/723 |
| 2015/0074027 | A1* | 3/2015 | Huang | G06F 40/40 706/25 |
| 2015/0161201 | A1* | 6/2015 | Sadikov | G06F 16/24542 707/722 |
| 2015/0293976 | A1* | 10/2015 | Guo | G06N 3/0454 707/706 |
| 2016/0371379 | A1* | 12/2016 | Fang | G06F 16/951 |
| 2017/0032035 | A1* | 2/2017 | Gao | G06N 3/08 |
| 2017/0109355 | A1* | 4/2017 | Li | G06N 3/0445 |
| 2017/0177729 | A1* | 6/2017 | Duke | G06F 16/951 |
| 2018/0067910 | A1* | 3/2018 | Alonso | G06Q 50/01 |

FOREIGN PATENT DOCUMENTS

| | | |
|---|---|---|
| CN | 106339756 A | 1/2017 |
| CN | 106415535 A | 2/2017 |

OTHER PUBLICATIONS

Ye et al. "Learning relevance from click data via neural network based similarity models," 2015 IEEE International Conference on Big Data (Big Data), Santa Clara, CA, 2015, pp. 801-806 (Year: 2015).*

Gunaratna, "Document Retrieval using Predication Similarity," arXiv:1604.05754 [cs.IR] Apr. 19, 2016 (Year: 2016).*

Cao et al., "Learning to rank: from pairwise approach to listwise approach." In Proceedings of the 24th international conference on Machine learning (ICML '07). (Year: 2007).*

Huang et al., "Learning Deep Structured Semantic Models for Web Search using Clickthrough Data," CIKM '13, Oct. 27-Nov. 1, 2013, San Francisco, CA, USA (Year: 2013).*

Severyn et al., "Learning to Rank Short Text Pairs with Convolutional Deep Neural Networks," SIGIR'15, Aug. 9-13, 2015, Santiago, Chile (Year: 2015).*

Xiong et al., "Explicit Semantic Ranking for Academic Search via Knowledge Graph Embedding," WWW 2017, Apr. 3-7, 2017, Perth, Australia. ACM 978-1-4503-4913-0/17/04 (Year: 2017).*

First Office Action from CN2017108385409.3, dated Jan. 17, 2020, with English translation provide by Global Dossier.

* cited by examiner

Relevant figures

Michelle — got married in 1992 and borne two daughters

Ann Dunham — US president Obama's mother

Mark Obama Ndesandjo — US president Obama's half younger brother

Donald Trump — US president Obama's successor

METHOD OF BUILDING A SORTING MODEL, AND APPLICATION METHOD AND APPARATUS BASED ON THE MODEL

The present application claims the priority of Chinese Patent Application No. 2017103854093, filed on May 26, 2017, with the title of "Method of building a sorting model, and application method and apparatus based on the model", the disclosure of which is incorporated herein by reference.

FIELD OF THE DISCLOSURE

The present disclosure relates to the technical field of computer application, and particularly to a method of building a sorting model, and an application method and apparatus based on the model.

BACKGROUND OF THE DISCLOSURE

As the Internet technologies develop rapidly, Chinese documents in the network increase abruptly, and various documents-sorting problems arise, for example, sorting search results in a search engine is a common type of document sorting. A query including a content word pair and a relationship word of the content word pair is searched more and more, for example, "Dehua Liu's wife Liqian Zhu", "Baidu's CEO Yanhong Li" or the like. As far as a search engine is concerned, whether the sorting of search results reflects the user's search demands affects a computing load, search result quality, the user's information-obtaining efficiency, the user's experience and the like. For example, if the sorting of the search results fails to well reflect the user's search demands, for example, if the search result that the user wants to view is ranked at a position behind, the user needs to expend more time in performing operations such as pulling down the page or turning pages, and therefore needs to request more computing resources, which affects the user's information-obtaining efficiency.

SUMMARY OF THE DISCLOSURE

The present disclosure provides a method of building a sorting model, a method of sorting search results, a method of determining a content word pair relationship describing sentence, and their corresponding apparatuses and computer storage medium, so that the search results meet the user's search demands more.

Specific technical solutions are as follows:

The present disclosure provides a method of building a sorting model, the method comprising:

obtaining, from a search log, a query including a relationship triple and a clicked title of a search result corresponding to the query, wherein the relationship triple includes a content word pair and a relationship word of the content word pair;

obtaining training data using the obtained query, the clicked title corresponding to the query, and times of click of the clicked title;

using the training data to train a neural network-based sorting model, the sorting model being used to sort sentences according to the sentences' description of the relationship of the content word pair.

The present disclosure further provides a method of sorting search results, the method comprising:

obtaining a query including a relationship triple, wherein the relationship triple includes a content word pair and a relationship word of the content word pair;

obtaining search results corresponding to the query;

sorting the search results according to a sorting result of the sorting model for titles of the search results;

wherein the sorting model is pre-built using the aforesaid method of building the sorting model.

The present disclosure further provides a method of determining a content word pair relationship describing sentence, the method comprising:

obtaining a query including a relationship triple, wherein the relationship triple includes a content word pair and a relationship word of the content word pair;

obtaining titles of search results corresponding to the query;

using the sorting model to sort the titles, and selecting a title from the titles according to the sorting results as a sentence for describing the relationship of the content word pair;

wherein the sorting model is pre-built using the aforesaid method of building the sorting model.

The present disclosure further provides a method of determining a content word pair relationship describing sentence, the method comprising:

determining a relevant content word corresponding to the query including a content word, and a relationship word of the content word and the relevant content word;

querying the relationship database to determine a content word pair formed by the content word and the relevant content word, and a sentence describing a relationship corresponding to the relationship word;

displaying the relevant content word, content word and relationship describing sentence;

wherein the sorting model is pre-built using the aforesaid method of building the sorting model.

The present disclosure provides an apparatus for building a sorting model, the apparatus comprising:

a data collecting unit configured to obtain, from a search log, a query including a relationship triple and a clicked title of a search result corresponding to the query, wherein the relationship triple includes a content word pair and a relationship word of the content word pair;

a training data determining unit configured to obtain training data using the obtained query, the clicked title corresponding to the query, and times of click of the clicked title;

a model training unit configured to use the training data to train a neural network-based sorting model, the sorting model being used to sort sentences according to the sentences' description of the relationship of the content word pair.

The present disclosure further provides an apparatus for sorting search results, the apparatus comprising:

a query obtaining unit configured to obtain a query including a relationship triple, wherein the relationship triple includes a content word pair and a relationship word of the content word pair;

a search result obtaining unit configured to obtain search results corresponding to the query;

a search result sorting unit configured to sort the search results according to a sorting result of the sorting model for titles of the search results;

wherein the sorting model is pre-built using the aforesaid apparatus for building the sorting model.

The present disclosure further provides an apparatus for determining a content word pair relationship describing sentence, the apparatus comprising:

a query obtaining unit configured to obtain a query including a relationship triple, wherein the relationship triple includes a content word pair and a relationship word of the content word pair;

a title obtaining unit configured to obtain titles of search results corresponding to the query;

a sentence determining unit configured to use the sorting model to sort the titles, and select a title from the titles according to the sorting results as a sentence for describing a relationship of the content word pair;

wherein the sorting model is pre-built using the aforesaid apparatus for building the sorting model.

The present disclosure further provides an apparatus for determining a content word pair relationship describing sentence, the apparatus comprising:

a determining unit configured to determine a relevant content word corresponding to a query including a content word, and a relationship word of the content word and the relevant content word;

a querying unit configured to query a relationship database to determine a content word pair formed by the content word and the relevant content word, and a sentence describing a relationship corresponding to the relationship word;

a displaying unit configured to display the relevant content word, content word and relationship describing sentence;

wherein the sorting model is pre-built using the aforesaid apparatus for building the sorting model.

The present disclosure further provides an apparatus, comprising a memory comprising one or more programs;

one or more processors coupled to the memory and configured to execute said one or more programs to implement operations executed in the above methods.

The present disclosure further provides a computer storage medium, the computer storage medium being encoded with a computer program, one or more computers being enabled to implement operations executed in the above methods, when the program is executed by said one or more computers.

As can be seen from the above technical solutions, according to the present disclosure, the training data is obtained based on the query including the relationship triple (the content word pair and the relationship word of the content word pair) in the search log and times of click of titles of clicked search results corresponding to the query. The sorting model is built based on the training data, and the sorting model can be used to sort sentences according to the sentences' description of the relationship of the content word pair. The sorting of search results of the query including the relationship triple can be achieved through the sorting model, and the sorting result reflects situations of description of the content word pair relationship by the titles of search results and meets the user's search demands more.

In addition, the sorting model may be used to determine the sentence describing the relationship of the content word pair, and store it in the relationship database so that when search engine, upon displaying the relevant content word with respect to the query including the content word, can further display the sentence describing the relationship between the relevant content word and the searched content word, thereby enabling the user to understand the relationship of the content word pair more visually and clearly.

DETAILED DESCRIPTION OF PREFERRED EMBODIMENTS

Figure 1:
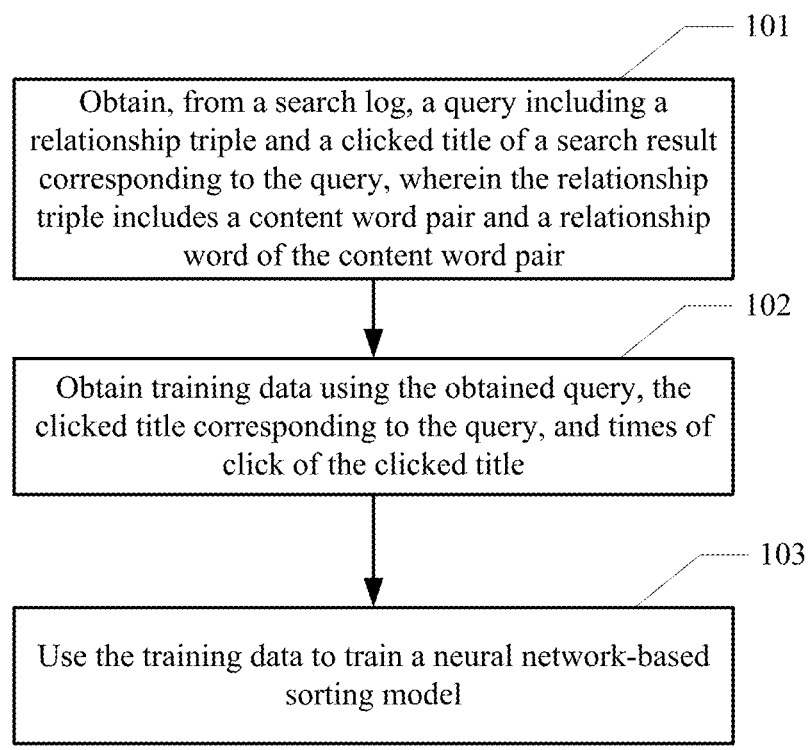
FIG. 1 is a flow chart of a method of building a sorting model according to an embodiment of the present disclosure.

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Embodiments of the present disclosure mainly involve two major phases: one phase is for building a sorting model, and the other phase is for performing relevant application using the pre-built sorting model. The two phases may be independent from each other. The two phases are described in detail by describing specific embodiments.

As for as a query including a content word pair and a relationship word of the content word pair is concerned, the user's search demands are to a great degree reflected on the relationship word of the content word pair, in addition to on the content word pair. Hence, the sorting of the search results is to a great degree reflected on situations of the result results describing the content word pair relationship. If a search result describes the content word pair relationship better, it usually can better meet the user's search demands. Hence, building the sorting model in the embodiment of the present disclosure is ranking sentences according to the sentences' description of the content word pair relationship, wherein in the search engine, sentences are mainly reflected as titles of search results.

Based on the above theory, the relationship of the content word pairs included by the query can be described better by reversely considering titles of search results that can better reflect the user's search demands. Reflection of the user's search demands in the search results may employ times of the user's click of the title of a search result (hereinafter referred to as "title"), that is, in the case the user searches for the query, if a certain title is clicked more, the title better describes the relationship of the content word pairs included by the query.

That is to say, the present disclosure converts the issue of describing inter-content words relationship into studies on click data. The method of building the scoring model according to the embodiment of the present disclosure is described in detail below with reference to FIG. 1. As shown in FIG. 1, the method may include the following steps:

In 101, a query including a relationship triple and a clicked title corresponding to the query are obtained from a search log, wherein the relationship triple includes a content word pair and a relationship word of the content word pair.

In the embodiment of the present disclosure, it is possible to, from the search log, obtain the specific type of query including the above relationship triple and obtain the clicked title corresponding to the query. Preferably, to ensure that the clicked title reflects the content word pair and its relationship, when the clicked title corresponding to the query is obtained, it is feasible to only obtain a title including the aforesaid content word pair among the clicked title corresponding to the query.

Assume the triple included by query $q_s$ is represented as ($e_h, r_k, e_t$), wherein the content word $e_h$ and content word $e_t$ form a content word pair, and $r_k$ is a relationship between the content word $e_h$ and content word $e_t$.

If the user clicks title t in the search results, and the title t includes content words $e_h$ and $e_t$ in the triple, the title t to a certain degree is a description of the relationship word $r_k$ in the triple. Furthermore, the times of click reflects the description situations, and the title t which is clicked for more times describes the $r_k$ more accurately and better.

The clicked title corresponding to the query is obtained as a candidate sentence set $S=\{s_1, s_2, \ldots, s_n\}$, and sentences in the candidate sentence set include content words $e_h$ and $e_t$. A target is to learn to obtain a sorting model which sorts sentences according to the situations of the sentences' description of the relationship $r_k$ between content words $e_h$ and $e_t$.

In 102, training data is obtained using the obtained query, the clicked title corresponding to the query, and the times of click of the clicked title.

In the embodiment of the present disclosure, the training data may be obtained by selecting a search log in a recent set time length. The set time length may be selected according to data scale and timeliness requirement. For example, the training data may be obtained by selecting a search log in recent 6 months.

In this step, the query-title pair may be selected as the training data. Specifically, if in the obtained clicked titles corresponding to a certain query, there exist title1 and title 2 which are clicked for different times, namely, the times of click of the two titles are different, the query-title1 pair and query-title2 pair may be added to the training data.

It is generally represented as: if cdif($q_s$, $t_i$, $t_j$)>0, $q_s$, $t_i$ and $t_j$ are added to the training data.

Wherein $t_i$ and $t_j$ are both clicked titles corresponding to the $q_s$. cdif($q_s$, $t_i$, $t_j$)=click($q_s$, $t_i$)−click($q_s$, $t_j$) click($q_s$, $t_i$) is a total times of click of $t_i$ as the clicked title corresponding to $q_s$, and click($q_s$, $t_j$) is a total times of click of $t_j$ as the clicked title corresponding to $q_s$.

In 103, the training data is used to train a neural network-based sorting model.

In the embodiment of the present disclosure, the training data is used to train a neural network-based sorting model to obtain the sorting model, wherein the neural network may employ CNN (Convolutional Neural Network), RNN (Recurrent Neural Network), LSTM (Long Short-Term Memory) network, or the like. CNN is taken as an example for description in the present embodiment.

In the embodiment of the present disclosure, a manner of training the sorting model employs a document pairwise training manner, that is, what is trained is a document pairwise sorting model. Specifically, the CNN may be trained using the training data so that relevancy between a feature vector of the query output by the CNN and feature vectors of two titles corresponding to the query is sorted according to the times of click of the two titles under the query, and the sorting exhibits a minimum loss.

Figure 2:
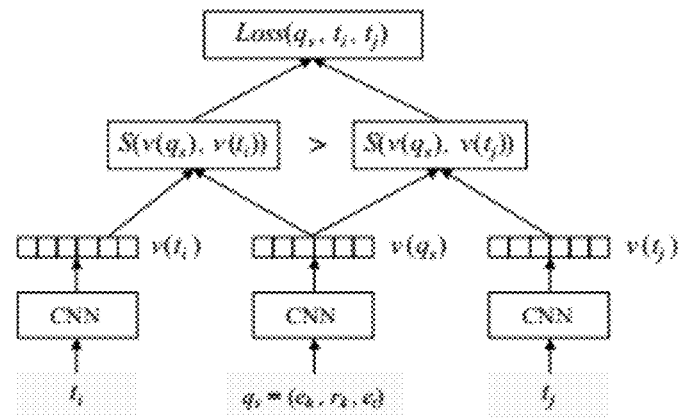
FIG. 2 is a schematic diagram showing principles of the sorting model according to the embodiment of the present disclosure.

As shown in FIG. 2, the model uses the tripe ($q_s$, $t_i$, $t_j$) as input of three CNNs, the purpose is to learn to obtain an expression function $\upsilon(\bullet)$ to represent $q_s$, $t_i$ an $t_j$ respectively as respective feature vectors $\upsilon(q_s)$, $\upsilon(t_i)$, $\upsilon(t_j)$ so that a relevancy score of $t_i$ and $q_s$ is higher than a relevancy score of $t_j$ and $q_s$.

$$S(\upsilon(q_s),\upsilon(t_i))>S(\upsilon(q_s),\upsilon(t_j))$$

Wherein $S(\bullet;\bullet)$ is used to calculate a relevancy between two vectors, for example cosine relevancy. That is to say, $S(\upsilon(q_s),\upsilon(t_i))$ reflects a relevancy of $t_i$ and $q_s$, and $S(\upsilon(q_s),\upsilon(t_j))$ reflects a relevancy of $t_j$ and $q_s$.

To make the above relevancy score capable of reflecting similarity sorting of the documents, loss Loss($q_s$, $t_i$, $t_j$) of the triple ($q_s$, $t_i$, $t_j$) is estimated on the topmost layer, namely, a sorting layer of the sorting model. In the embodiments of the present disclosure, the more the relevancy of the feature vectors of the query and the corresponding title is positively relevant to the times of click of the title, the smaller the sorting loss of the title is. Subsequent to the above example, Loss($q_s$, $t_i$, $t_j$) may employ:

$$\mathrm{Loss}(q_s,t_i,t_j)=\max(0,1-S(\upsilon(q_s),\nu(t_i))+S(\upsilon(q_s),\nu(t_j)))$$

Since the times of click of $t_i$ is higher than that of $t_j$, the degree to which the times of click of $t_i$ is higher than $t_j$ is larger. In an ideal case, the lager the degree to which a value of $S(\upsilon(q_s),\upsilon(t_i))$ is larger than $S(\upsilon(q_s),\upsilon(t_j))$ is, whereupon a value of Loss($q_s$, $t_i$, $t_j$) is smaller. The above sorting loss function is only an example provided by the embodiment of the present disclosure, and other loss functions may also be employed, and will not be listed one by one here.

The sorting layer does not have a parameter. While the sorting layer calculates the triple during training, in the case of a given query, the sorting of the two title pairs loses, and the loss is fed back to a lower layer so that the lower layer adjusts the parameter to thereby minimize the sorting loss so that the learnt features are better. The learning procedure may be expressed by the following target:

$$\min_W \sum_{(q_s,t_i,t_j)\in P} \text{Loss}(q_s, t_i, t_j) + \lambda \|W\|^2$$

Wherein P is a set constituted by all triples ($q_s$, $t_i$, $t_j$) in the training data, $\lambda$ is a regular parameter for improving the sorting model, and W is a CNN parameter representing the function $\upsilon(\bullet)$.

Figure 3:
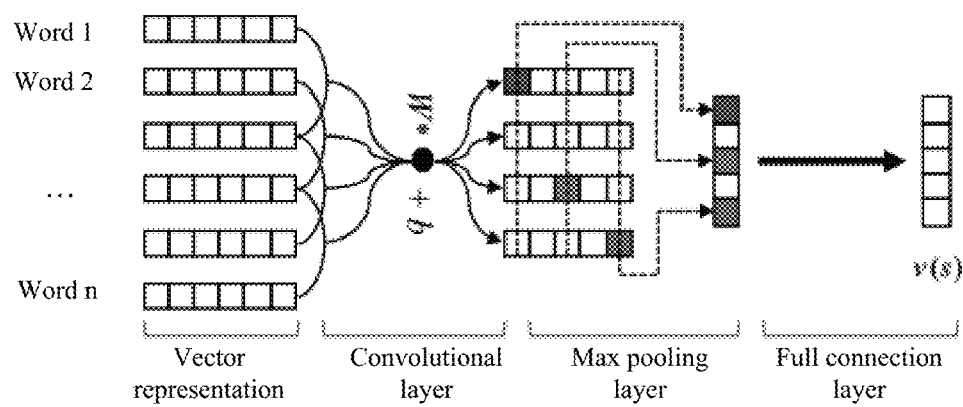
FIG. 3 is a schematic diagram showing principles of CNN according to an embodiment of the present disclosure.

A working principle of CNN is briefly described below. As shown in FIG. 3, first, words in the sentence (namely, title) are converted into a vector which includes sense of the words and grammatical information. Then, a slide window with a length h (for example, 3 is taken as its value) is employed in the convolutional layer as a convolutional filter to extract features from the sentence. To ensure that the convolutional filter is applied to each element of a matrix for input, it is feasible to perform zero fill for respective input before the convolution. The convolutional filter is obtained by automatic learning in the CNN. Then, a max pooling layer performs dimensionality reduction processing for the features, only important features are retained. Finally, the max pooling layer outputs the processed features to a full connection layer, the full connection layer performs non-linear transformation for the features to obtain a feature vector $\upsilon(\bullet)$ of the sentence, wherein sigmoid may be used to activate the function while the non-linear transformation is performed.

So far, the building of the sorting model is completed.

For example, as for the query "Dehua Liu's wife Liqian Zhu", content words $e_h$ and $e_t$ are respectively "Dehua Liu" and "Liqian Zhu", and the relationship word $r_k$ is "wife". Clicked titles including a corresponding content word pair "Dehua Liu" and "Liqian Zhu" are collected as shown in Table 1:

TABLE 1

| Title serial number | title | Times of click |
|---|---|---|
| t1 | Dehua Liu and Liqian Zhu declare marriage | 39 |
| t2 | Dehua Liu and Liqian Zhu has already been married over 2 years | 23 |
| t3 | Dehua Liu and Liqian Zhu hold a wedding ceremony secretly | 10 |
| t4 | Dehua Liu and Liqian Zhu determine their fall-in-love relationship | 5 |
| t5 | How long Liqian Zhu waited for Dehua Liu | 1 |
| t6 | Classic photos of Dehua Liu's wife Liqian Zhu | 0 |
| t7 | Brief introduction of Dehua Liu's wife Liqian Zhu | 0 |

As far as the titles in the above table are concerned, a title which is clicked the most describes the relationship "wife" between "Dehua Liu" and "Liqian Zhu" better. During the learning procedure of CNN for training the sorting model, it is possible to learn, from the titles, various expression methods and phrases often used to describe a certain relationship. For example, "photos" and "brief introduction" in titles t6 and t7 describe the relationship of the two persons less than "declare marriage", "married" and "hold a wedding ceremony secretly" in titles t1, t2 and t3.

Application manners of the sorting model are described below. Its applications may include but not limited to:

1) sorting search results corresponding to the query including the relationship triple, wherein the relationship triple includes a content word pair and a relationship word of the content word pair.

2) determining the content word pair relationship describing sentence, namely, automatically finding accurate description of the content word pair relationship.

3) upon performing content word recommendation in the search engine, displaying the relationship-describing sentence while displaying the relationship between the recommended content word and the searched content word.

The above application manners are described respectively in conjunction with embodiments.

Figure 4:
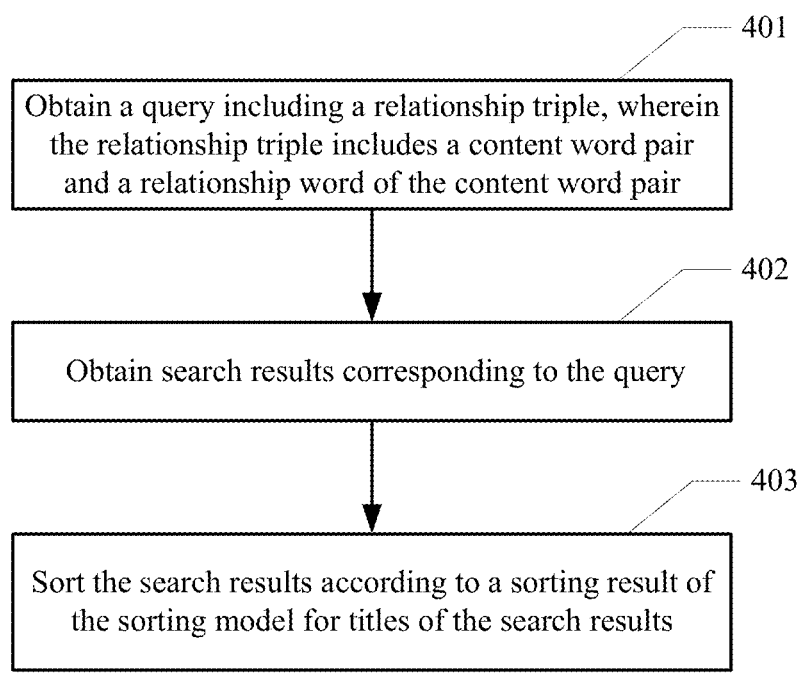
FIG. 4 is a flow chart of a method of sorting search results according to an embodiment of the present disclosure.

FIG. 4 is a flow chart of a method of sorting search results according to an embodiment of the present disclosure. The flow uses the sorting model built in the embodiment shown in FIG. 1. As shown in FIG. 4, the method may include the following steps:

In 401, a query including a relationship triple is obtained, wherein the relationship triple includes a content word pair and a relationship word of the content word pair.

The query obtained in the step may be the query including the relationship triple and input when the user performs network search. The query may only include a content word pair and a relationship word of the content word pair, or may further include other words, but the relationship triple is extracted therefrom upon processing.

For example, the query input by the user in the search input box is "Dehua Liu wife, Liqian zhu", and it may also be "Dehua Liu's ideal wife Liqian Zhu", and the relationship triple is extracted therefrom: the content word pair "Dehua Liu" and "Liqian Zhu", and the relationship word "wife".

In 402, search results corresponding to the query are obtained.

The query is used to search in a search database to obtain search results.

In 403, the search results are sorted according to a sorting result of the sorting model for titles of the search results.

The content word pair, the relationship word of the content word pair and the titles of search results corresponding to the query are input in the pre-built sorting model to obtain the sorting result of the sorting model for titles of the search results.

When the search results are sorted, it is feasible to consider the sorting result of the sorting model for titles as a final sorting result or an important feature of the final sorting result. As for the query including the triple, the user's search demands are to a large degree reflected on the relationship of the content word pair. If the better the titles of the search results describe the relationship of the content word pair, the user's search demands are reflected to a larger degree, and titles may be ranked closer to the top when the search results are sorted.

When the sorting result of the sorting model for titles is considered as an important feature of the final sorting result, it is further feasible to sort the search results in conjunction with other sorting features, for example, the relevancy of the search results and the query, authority degree of source web sites of the search results, timeliness of search results and the like may be considered as the sorting basis. It is feasible to set different sorting weight for different sorting basis, perform comprehensive scoring, and then sort the search results according the scoring results.

Due to heterogeneity, semantic richness and large scale, a knowledge graph is extensively applied to various search applications, for example, expand search results based on semantics and perform content word recommendation. Depictions presenting the inter-content word relationship in the knowledge graph facilitate building and enhancing user's trust for a content word-recommending system.

Figure 5:
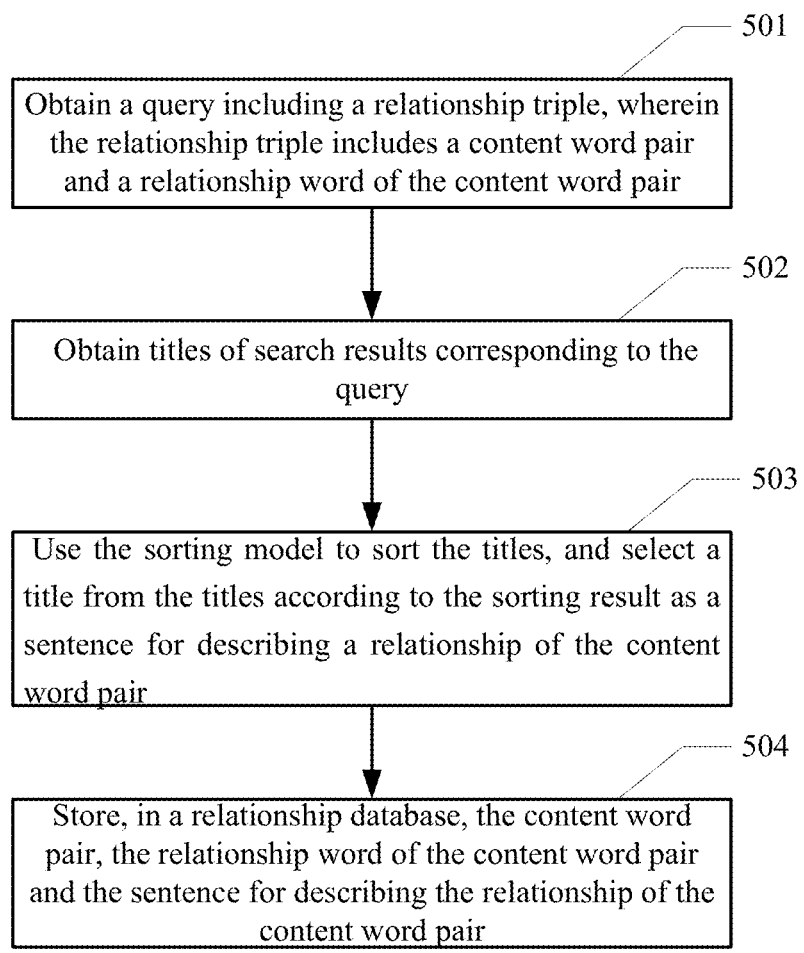
FIG. 5 is a flow chart of a method of determining a content word pair relationship describing sentence according to an embodiment of the present disclosure.

FIG. 5 is a flow chart of a method of determining a content word pair relationship describing sentence according to an embodiment of the present disclosure. The flow uses the sorting model built in the embodiment shown in FIG. 1. As shown in FIG. 5, the method may include the following steps:

In 501, a query including a relationship triple is obtained, wherein the relationship triple includes a content word pair and a relationship word of the content word pair.

It is feasible to obtain a content word pair and a relationship word of the content word pair from the knowledge graph to form the query. For example, when a content word pair formed by "Brad Pitt"-"Angelina Jolie" exists in the knowledge graph, the relationship word of the content word pair is "husband and wife", and the triple is used to form the query "Brad Pitt Angelina Jolie husband and wife".

In 502, titles of search results corresponding to the query are obtained.

The obtained query is used to search to obtain titles of the search results.

In 503, the sorting model is used to sort the titles, and a title is selected from the above titles according to the sorting results as a sentence for describing the relationship of the content word pair included by the query.

The content word pair, the relationship word of the content word pair and the titles of search results corresponding to the query are input in the sorting model to obtain the sorting result of the sorting model for titles of the search results.

Then, it is feasible to, according to the sorting results, select N titles ranking the highest from the search results as the content word relationship describing sentences, N being a preset positive integer, for example, select the title ranking the highest from titles of the search results as the content word pair relationship describing sentence.

For example, search is performed according to the query "Brad Pitt Angelina Jolie husband and wife" to obtain titles of search results, then Brad Pitt, Angelina Jolie, husband and wife and titles of search results are input in the sorting model to obtain the sorting result for titles of the search results. Then, the title "Brad Pitt and Angelina Jolie got married in 2014 and jointly acted in the movie Mr. & Mrs. Smith" ranking the highest is considered as the sentence describing the relationship "husband and wife" of the content word pair "Brad Pitt" and "Angelina Jolie".

In 504, the content word pair, the relationship word of the content word pair and the content word pair relationship describing sentence are stored in the relationship database.

Subsequent to the above example, in the relationship database is stored "Brad Pitt"-"Angelina Jolie"-"husband and wife"-"Brad Pitt and Angelina Jolie got married in 2014 and jointly acted in the movie Mr. & Mrs. Smith" in the format "content word 1"-"content word 2"-"relationship word"-"relationship describing sentence".

Figure 6:
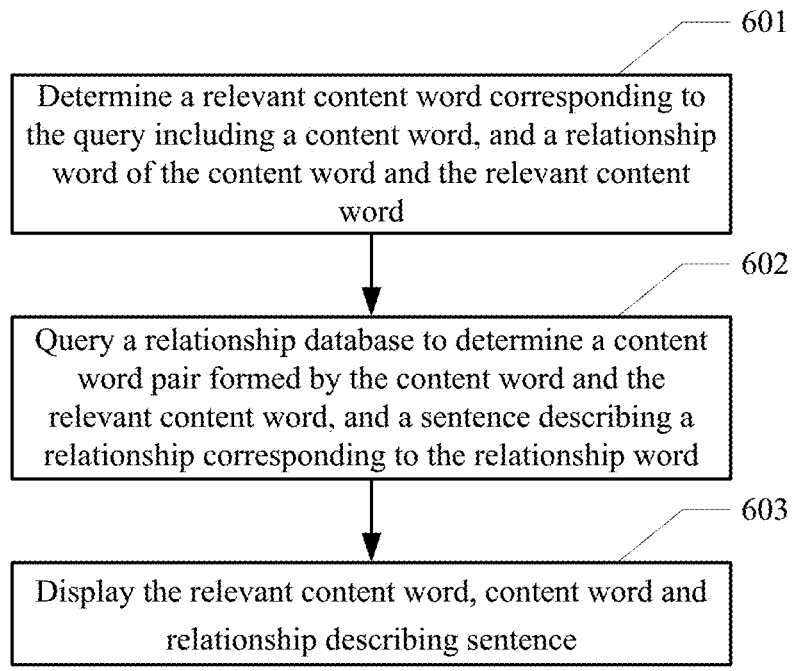
FIG. 6 is a flow chart of a method of recommending content words according to an embodiment of the present disclosure.

FIG. 6 is a flow chart of a method of recommending content words according to an embodiment of the present disclosure. As shown in FIG. 6, the method may include the following steps:

In 601, determination is made to a relevant content word corresponding to the query including a content word, and a relationship word of the content word and the relevant content word.

After the user inputs the query in the search engine, it is feasible to recommend to the user a content word relevant to the query as the relevant content word, and further determine the relationship word of the content word and the relevant content word.

The relevant content word and the relationship word may be determined in a manner of querying the knowledge graph or querying the relationship database built in the embodiments shown in FIG. 5.

In 602, the relationship database is queried to determine the content word pair formed by the content word and the relevant content word, and the sentence describing the relationship corresponding to the relationship word.

In this step, the content word and the relevant content word searched by the user are considered as the content word pair, and the content word pair and the relationship word of the content word pair are used to query in the relationship database built in the embodiment as shown in FIG. 5 to determine the corresponding relationship describing sentence.

In 603, the aforesaid relevant content word, content word and relationship describing sentence are displayed.

In the embodiment of the present disclosure, it is feasible to display the aforesaid relevant content word, content word and relationship describing sentence in a preset region of a page of search results corresponding to the query, or display the aforesaid relevant content word and relationship word in a preset region of a page of search results corresponding to the query. When an event of the aforesaid preset region is captured, the relationship describing sentence is displayed. For example, it is feasible to display the relevant content word in a right upper region of the search result page, and display the relationship word below the relevant content word. When the user's mouse suspends at the region where the relationship word lies, the corresponding relationship describing sentence is displayed. Certainly, it is also feasible to employ other regions, manners or patterns to display the relevant content word, content word and relationship describing sentence, which are no longer listed one by one.

Figure 7A:
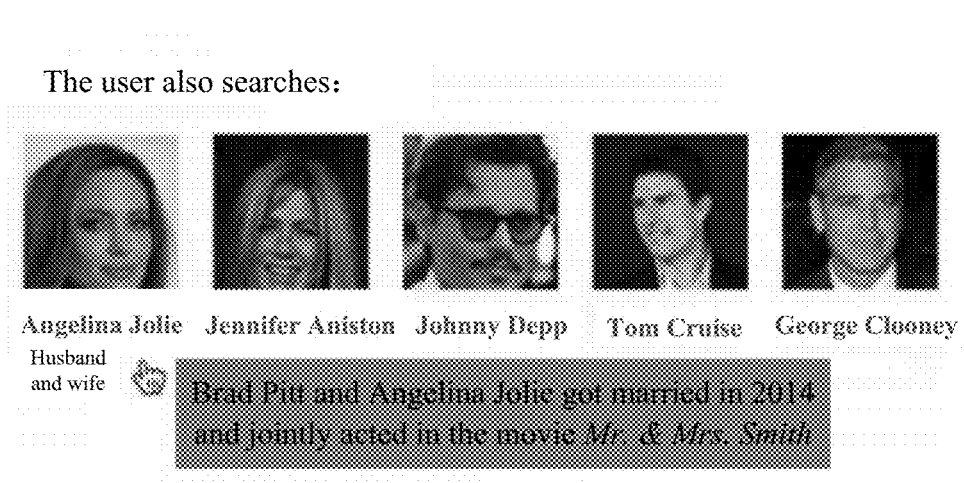
FIG. 7a is an example diagram for displaying relevant content words according to an embodiment of the present disclosure.

For example, the user searches for the query "Brad Pitt" in the search engine, and relevant content words "Angelina Jolie", "Jennifer Aniston", "Johnny Depp", "Tom Cruise" and the like are displayed in the right upper region of the search result page shown in FIG. 7a.

Below the relevant content word "Angelina Jolie" is displayed the relationship word "husband and wife" with "Brad Pitt". When the mouse suspends nearby the relationship word "husband and wife", the sentence "Brad Pitt and Angelina Jolie got married in 2014 and jointly acted in the movie Mr. & Mrs. Smith" describing the relationship (namely, "husband and wife") between the two content words is displayed to the user. According to the sentence, the user can more easily understand the relationship between the two content words.

Figure 7B:
FIG. 7b is another example diagram for displaying relevant content words according to an embodiment of the present disclosure.
Figure 7B:
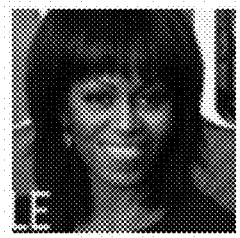
Figure 7B:
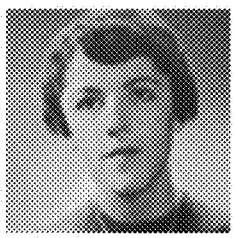
Figure 7B:
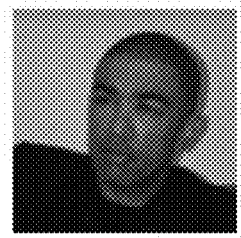
Figure 7B:
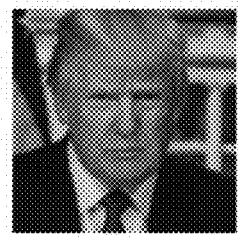

Again as shown in FIG. 7b, the user searches for the query "Obama" in the search engine, and relevant content words "Michelle", "Ann Dunham", "Mark Obama Ndesandjo", "Donald Trump" and the like are displayed in the right upper region of the search result page shown in FIG. 7b.

A word of relationship with "Obama" is not displayed below each of the relevant content words, but instead, sentences describing the relationship between the relevant content words and the searched content word "Obama" are directly displayed. For example, below "Michelle" is displayed the sentence "got married in 1992 and borne two daughters", the sentence describes the relationship between "Michelle" and "Obama", and the previous relationship between the two content words can be clearly acquired from the sentence.

Additionally, it needs to be appreciated that the embodiments of the present disclosure are described with the Chinese language as an example, but the implementation modes provided by the present disclosure are not limited to the Chinese language, and they also apply to other language. Take English language as an example, in the above manner of the present disclosure, a correspondence relationship "Andy Lau"-"Carol Chu"-"Wife"-"Andy Lau announces his marriage with Carol Chu sentences" may be established in the relationship database. When the user searches for "Andy Lau", the relevant content words "Carol Chu" and the relationship word "Wife" may be displayed in a right region of the search result page. When the mouse suspends at the region of relevant content words, the sentence "Andy Lau announces his marriage with Carol Chu sentences" describing the relationship "Wife" of "Andy Lau" and Carol Chu" is displayed.

The above is detailed description of the method according to the present disclosure. Hereunder the apparatus according to the present disclosure will be described in detail in conjunction with embodiments. A subject for implementing the method according to embodiments of the present disclosure, namely, a corresponding apparatus may be an application, plug-in unit or software development kit or the like at the server end.

Figure 8:
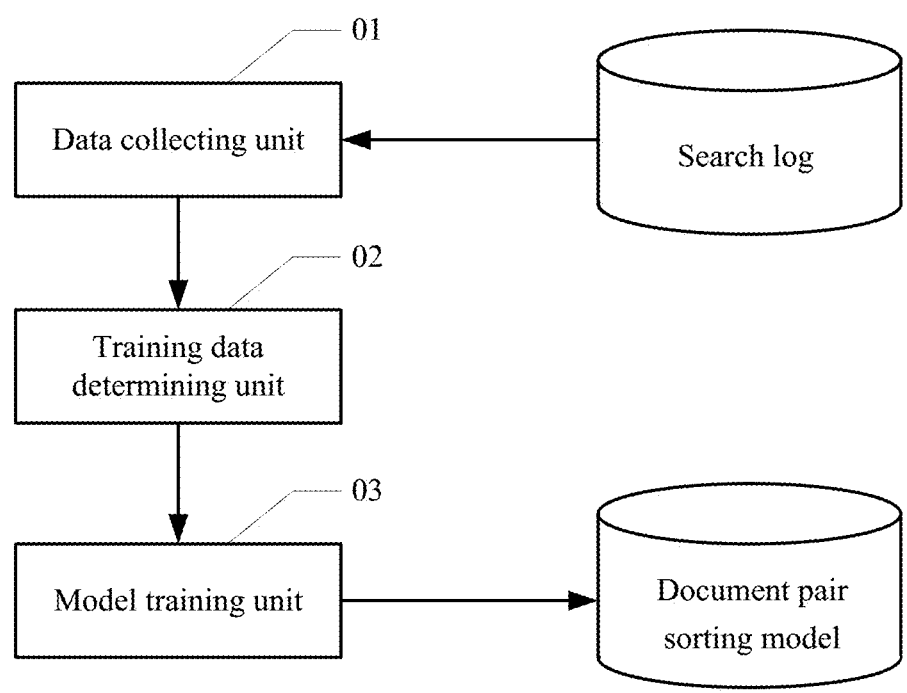
FIG. 8 is a block diagram of an apparatus for building a sorting model according to an embodiment of the present disclosure.

FIG. 8 is a block diagram of an apparatus for building a sorting model according to an embodiment of the present disclosure. The apparatus is used to execute the flow in the embodiment shown in FIG. 1. As shown in FIG. 8, the apparatus may comprise: a data collecting unit 01, a training data determining unit 02 and a model training unit 03, wherein the units have the following main functions:

The data collecting unit 01 is configured to obtain, from a search log, a query including a relationship triple and a clicked title of a search result corresponding to the query, wherein the relationship triple includes a content word pair and a relationship word of the content word pair.

Preferably, to ensure that the clicked title reflects the content word pair and its relationship, when the data collecting unit 01 obtain the clicked title corresponding to the query, it may only obtain a title including the aforesaid content word pair among the clicked titles corresponding to the query.

The training data determining unit 02 is configured to obtain training data using the obtained query, the clicked title corresponding to the query, and the times of click of the clicked title. Specifically, if in the clicked titles corresponding to the obtained query, there exist two titles which are clicked for different times, the training data determining unit 02 may add a document formed by the query with the two titles respectively to the training data as a sample.

The model training unit 03 is configured to use the training data to train a neural network-based sorting model. The sorting model is used to sort sentences according to the sentences' description of the relationship of the content word pair.

Wherein the employed neural network may include but not limited to CNN, RNN, LSTM or the like.

Specifically, the neural network may be trained using the training data so that relevancy between a feature vector of the query output by the neural network and feature vectors of two titles corresponding to the query is sorted according to the times of click of the two titles, with a minimum sorting loss.

Wherein the more a difference of the relevancy of the feature vector of the query and the feature vector of the two corresponding titles is positively relevant to a difference of the times of click of the two titles, the smaller the sorting loss is. Reference may be made to depictions in the method embodiment for examples of specific sorting loss, which will not be detailed any more here.

Figure 9:
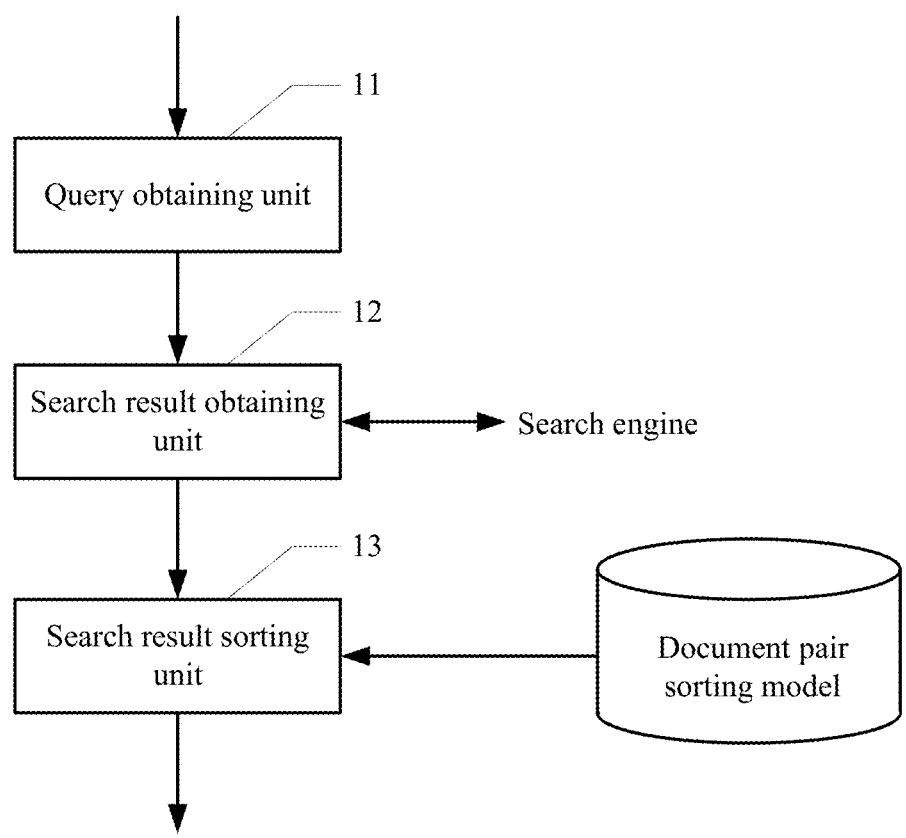
FIG. 9 is a block diagram of an apparatus for sorting search results according to an embodiment of the present disclosure.

FIG. 9 is a block diagram of an apparatus for sorting search results according to an embodiment of the present disclosure. The apparatus is used to execute the flow in the embodiment shown in FIG. 4. As shown in FIG. 9, the apparatus may include: a query obtaining unit 11, a search result obtaining unit 12 and a search result sorting unit 13. The units have the following main functions:

The query obtaining unit 11 is configured to obtain a query including a relationship triple, wherein the relationship triple includes a content word pair and a relationship word of the content word pair. The query may be the query including the relationship triple and input when the user performs network search. The query may only include a content word pair and a relationship word of the content word pair, or may further include other words, but the relationship triple is extracted therefrom upon processing.

The search result obtaining unit 12 is configured to obtain search results corresponding to the query. For example, the search results corresponding to the query may be obtained from the search engine.

The search result sorting unit 13 is configured to sort the search results according to a sorting result of the sorting model for titles of the search results, wherein the sorting model is pre-built using the apparatus in the embodiment shown in FIG. 8.

Specifically, the search result sorting unit 13 may input the content word pair, the relationship word of the content word pair and the titles of search results corresponding to the query in the sorting model to obtain the sorting result of the sorting model for titles of the search results.

When the search results are sorted, it is feasible to consider the sorting result of the sorting model for titles as a final sorting result or an important feature of the final sorting result. As for the query including the triple, the user's search demands are to a large degree reflected on the relationship of the content word pair. If the better the titles of the search results describe the relationship of the content word pair, the user's search demands are reflected to a larger degree, and therefore titles may be ranked closer to the top when the search results are sorted.

When the sorting result of the sorting model for titles is considered as an important feature of the final sorting result, it is further feasible to sort the search results in conjunction with other sorting basis, for example, the relevancy of the search results and the query, authority degree of source web sites of the search results, timeliness of search results and the like may be considered as the sorting basis. It is feasible to set different sorting weight for different sorting basis, perform comprehensive scoring, and then sort the search results according the scoring results.

Figure 10:
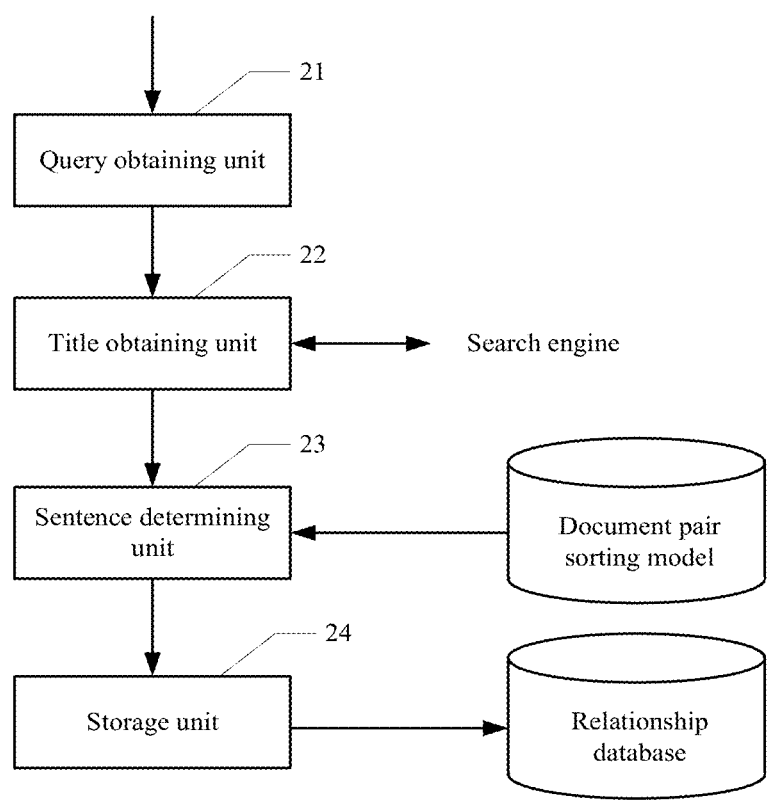
FIG. 10 is a block diagram of an apparatus for determining a content word pair relationship describing sentence according to an embodiment of the present disclosure.

FIG. 10 is a block diagram of an apparatus for determining a content word pair relationship describing sentence according to an embodiment of the present disclosure. The apparatus is used to execute the flow in the embodiment shown in FIG. 5. As shown in FIG. 10, the apparatus may include: a query obtaining unit 21, a title obtaining unit 22 and a sentence determining unit 23 as well as a storage unit 24. The units have the following main functions:

The query obtaining unit 21 is configured to obtain a query including a relationship triple, wherein the relationship triple includes a content word pair and a relationship word of the content word pair.

The title obtaining unit 22 is configured to obtain titles of search results corresponding to the query, and preferably obtain a title including the content word pair from the titles of the search results corresponding to the query. For example, obtain, from the search engine, a title including the content word pair from the titles of the search results corresponding to the query.

The sentence determining unit 23 is configured to use the sorting model to sort the titles, and select a title from the titles according to the sorting results as a sentence for describing the relationship of the content word pair, wherein the sorting model is pre-built using the apparatus in the embodiment shown in FIG. 8.

When the sentence determining unit 23 selects a title from the titles according to the sorting results as a sentence for describing the relationship of the content word pair, it is feasible to select N titles ranking the highest from the search results as the content word relationship describing sentences, N being a preset positive integer, for example, select the title ranking the highest from titles of the search results as the content word pair relationship describing sentence.

The storage unit 24 is configured to store, in a relationship database, the content word pair, the relationship word of the content word pair and the sentence for describing the relationship of the content word pair.

Figure 11:
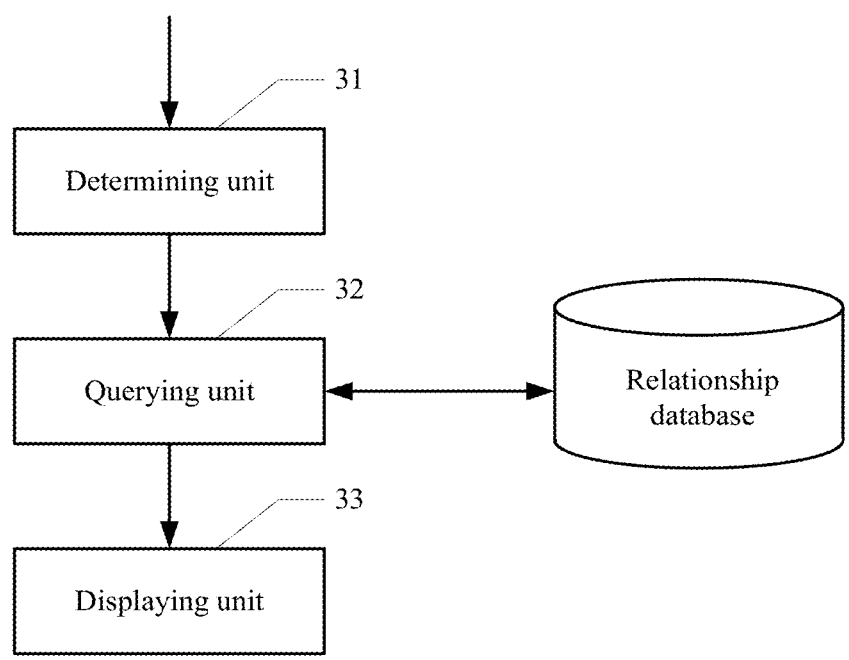
FIG. 11 is a block diagram of another apparatus for determining a content word pair relationship describing sentence according to an embodiment of the present disclosure.

FIG. 11 is a block diagram of another apparatus for determining a content word pair relationship describing sentence according to an embodiment of the present disclosure. As shown in FIG. 11, the apparatus may include: a determining unit 31, a querying unit 32 and a displaying unit 33. The units have the following main functions:

The determining unit 31 is configured to determine a relevant content word corresponding to the query including a content word, and a relationship word of the content word and the relevant content word. After the user inputs the query in the search engine, it is feasible to recommend to the user a content word relevant to the query as the relevant content word, and further determine the relationship word of the content word and the relevant content word included in the query.

The relevant content word and the relationship word may be determined in a manner of querying the knowledge graph or querying in the relationship database built in the embodiments shown in FIG. 5.

The querying unit 32 is configured to query the relationship database to determine the content word pair formed by the content word and the relevant content word, and the sentence describing the relationship corresponding to the relationship word.

The displaying unit 33 is configured to display the relevant content word, content word and relationship describing sentence, wherein the sorting model is pre-built using the apparatus in the embodiment shown in FIG. 8.

Wherein the displaying unit 33 may display the aforesaid relevant content word, content word and relationship describing sentence in a preset region of a page of search results corresponding to the query, or display the aforesaid relevant content word and relationship word in a preset region of a page of search results corresponding to the query. When an event of the aforesaid preset region is captured, the relationship describing sentence is displayed. For example, it is feasible to display the relevant content word in a right upper region of the search result page, and display the relationship word below the relevant content word. When the user's mouse suspends at the region where the relationship word lies, the corresponding relationship describing sentence is displayed. Certainly, it is also feasible to employ other regions, manners or patterns to display the relevant content word, content word and relationship describing sentence, which are no longer listed one by one.

Figure 12:
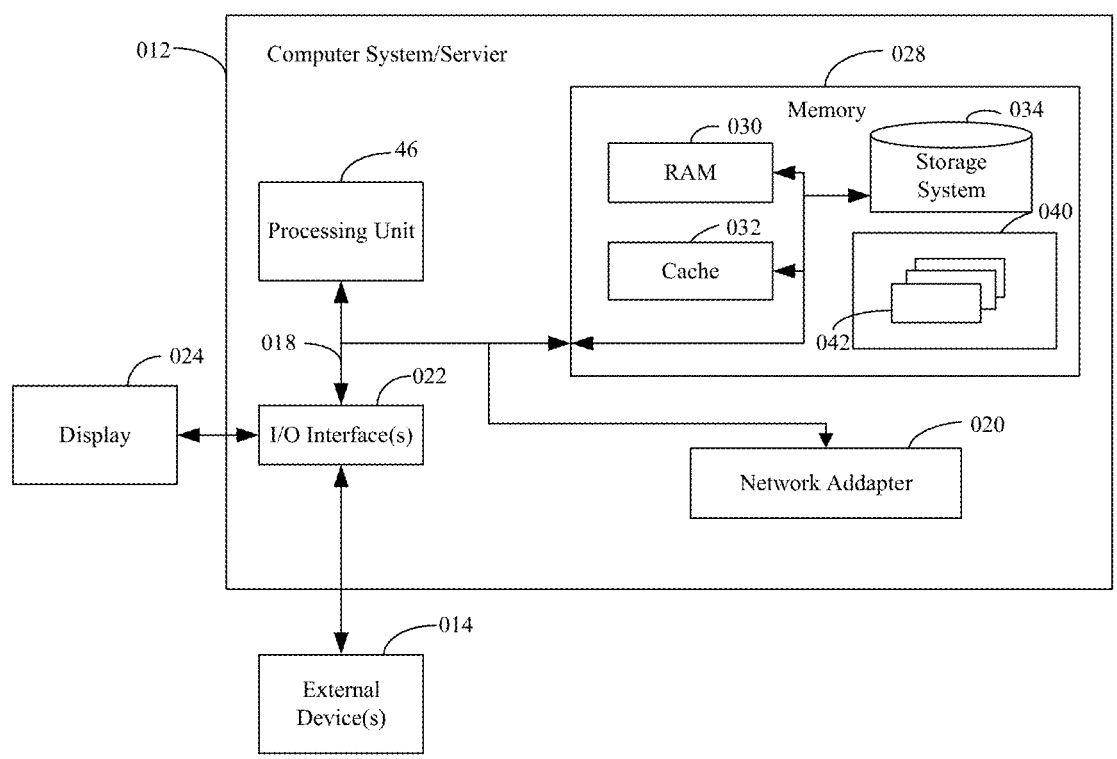
FIG. 12 is a block diagram of an exemplary computer system/server adapted for implementing an embodiment of the present disclosure.

The above method and apparatus provided by embodiments of the present disclosure may be implemented by a computer program arranged and running in equipment (e.g., a computer system or server). FIG. 12 is a block diagram of an exemplary computer system/server 012 adapted for implementing an embodiment of the present disclosure. The computer system/server 012 displayed in FIG. 12 is only an example and should not bring about any limitation to functions and use scope of embodiments of the present disclosure.

As shown in FIG. 12, the computer system/server 012 is shown in the form of a general-purpose computing device. The components of computer system/server 012 may include, but are not limited to, one or more processors or processing units 016, a system memory 028, and a bus 018 that couples various system components including system memory 028 and the processing unit 016.

Bus 018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

System memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 12 and typically called a "hard drive"). Although not shown in FIG. 12, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 018 by one or more data media interfaces. The memory 028 may include at least one program product having a set (e.g., at least one) of program modules that are configured to carry out the functions of embodiments of the invention.

Program/utility 040, having a set (at least one) of program modules 042, may be stored in memory 028 by way of example, and not limitation, as well as an operating system, one or more application programs, other program modules, and program data. Each of the operating system, one or more application programs, other program modules, and program data or some combination thereof, may include an implementation of a networking environment. Program modules 042 generally carry out the functions and/or methodologies of embodiments of the invention as described herein.

Computer system/server 012 may also communicate with one or more external devices 014 such as a keyboard, a pointing device, a display 024, etc.; in the present disclosure, the computer system/server 012 communicates with an external radar device, or may also communicates with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a wide area network (WAN), and/or a public network (e.g., the Internet) via network adapter 020. As depicted, network adapter 020 communicates with the other components of computer system/server 012 via bus 018. It should be understood that although not shown in FIG. 12, other hardware and/or software components could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the system memory 028, for example, implementing the method of building the sorting model may comprise:

obtaining, from a search log, a query including a relationship triple and a clicked title of a search result corresponding to the query, wherein the relationship triple includes a content word pair and a relationship word of the content word pair;

obtaining training data using the obtained query, the clicked title corresponding to the query, and the times of click of the clicked title;

using the training data to train a neural network-based sorting model. The sorting model is used to sort sentences according to the sentences' description of the relationship of the content word pair.

Again for example, implementing the method of sorting the search results may comprise:

obtaining a query including a relationship triple, wherein the relationship triple includes a content word pair and a relationship word of the content word pair;

obtaining search results corresponding to the query;

sorting the search results according to a sorting result of the sorting model for titles of the search results.

Again for example, implementing the method of determining the content word pair relationship describing sentence may comprise:

obtaining a query including a relationship triple, wherein the relationship triple includes a content word pair and a relationship word of the content word pair;

obtaining titles of search results corresponding to the query;

using the sorting model to sort the titles, and selecting a title from the titles according to the sorting results as a sentence for describing the relationship of the content word pair.

Again for example, implementing the method of determining the content word pair relationship describing sentence may comprise:

determining a relevant content word corresponding to the query including a content word, and a relationship word of the content word and the relevant content word;

querying the relationship database to determine the content word pair formed by the content word and the relevant content word, and the sentence describing the relationship corresponding to the relationship word;

displaying the relevant content word, content word and relationship describing sentence.

The above computer program may be arranged in a computer storage medium, that is, the computer storage medium is encoded with a computer program. When the program is executed by one or more computers, said one or more computers are enabled to execute the flow of methods and/or operations of the apparatuses as shown in the above embodiments of the present disclosure. For example, the flow of the method executed by the above one or more processors may comprise:

obtaining, from a search log, a query including a relationship triple and a clicked title of a search result corresponding to the query, wherein the relationship triple includes a content word pair and a relationship word of the content word pair;

obtaining training data using the obtained query, the clicked title corresponding to the query, and the times of click of the clicked title;

using the training data to train a neural network-based sorting model. The sorting model is used to sort sentences according to the sentences' description of the relationship of the content word pair.

Again for example, the flow of the method executed by the above one or more processors may comprise:

obtaining a query including a relationship triple, wherein the relationship triple includes a content word pair and a relationship word of the content word pair;

obtaining search results corresponding to the query;

sorting the search results according to a sorting result of the sorting model for titles of the search results.

Again for example, the flow of the method executed by the above one or more processors may comprise:

obtaining a query including a relationship triple, wherein the relationship triple includes a content word pair and a relationship word of the content word pair;

obtaining titles of search results corresponding to the query;

using the sorting model to sort the titles, and selecting a title from the titles according to the sorting results as a sentence for describing the relationship of the content word pair.

Again for example, the flow of the method executed by the above one or more processors may comprise:

determining a relevant content word corresponding to the query including a content word, and a relationship word of the content word and the relevant content word;

querying the relationship database to determine the content word pair formed by the content word and the relevant content word, and the sentence describing the relationship corresponding to the relationship word;

displaying the relevant content word, content word and relationship describing sentence.

As time and technologies advance, the meaning of media becomes more and more extensive. Propagation channels of computer programs are no longer limited to tangible media, and computer programs may also directly downloaded from the network. Any combinations of one or more computer-readable media may be employed. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the text herein, the computer readable storage medium can be a tangible device that can retain and store instructions for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present disclosure, not intended to limit the disclosure. Any modifications, equivalent replacements, improvements and the like made within the spirit and principles of the present disclosure, should all be included in the present disclosure within the scope of protection.

What is claimed is:

1. A method of building a sorting model for sorting search results comprising a plurality of titles, wherein the method comprises:

obtaining, from a search log, a query including a relationship triple and a clicked title of a search result corresponding to the query, wherein the relationship triple includes a content word pair and a relationship word of the content word pair, wherein the relationship word represents a relationship between the two content words in the content word pair and the clicked title is a clicked title comprising the content word pair;

obtaining training data using the obtained query, the clicked title corresponding to the query, and times of click of the clicked title;

using the training data to train a neural network-based sorting model, the sorting model being used to sort sentences according to the sentences' description of a relationship of the content word pair, wherein the trained neural network-based sorting model is configured to sort titles based on an input triple representing a given query, wherein the input triple comprises two content words and a relationship word, which are determined from the given query by a knowledge graph or a relationship database;

wherein the obtaining training data using the obtained query, the clicked title corresponding to the obtained query, and times of click of the clicked title comprises:

if in a plurality of clicked titles corresponding to the obtained query, there exist two titles which are clicked for different times, adding document pairs formed by the obtained query with the two titles respectively to the training data, wherein the neural network-based sorting model comprises at least one neural network which is trained using the training data so that relevancies between a feature vector of the obtained query output by the neural network and respective feature vectors of two titles corresponding to the obtained query are sorted according to the times of click of the two titles under the obtained query, with a sorting loss being estimated and fed back to the neural network to adjust parameters to minimize the sorting loss, wherein the more the relevancy of the feature vectors of the obtained query and the corresponding title is positively relevant to the times of click of the title, the smaller the sorting loss of the title is, wherein the more that a difference between the relevancy of the feature vector of the obtained query output by the neural network and the feature vector of one of the two titles and the relevancy of the feature vector of the obtained query and the feature vector of another of the two titles is positively related to a difference between the times of click of the two titles, the smaller the sorting loss is.

2. The method according to claim 1, wherein the neural network comprises: a Convolutional Neural Network, a Recurrent Neural Network, or a Long Short-Term Memory network.

3. A method of sorting search results comprising a plurality of titles, wherein the method comprises:

performing the method of claim 1 to build a sorting model;

obtaining a query including a relationship triple, wherein the relationship triple includes a content word pair and a relationship word of the content word pair, wherein the relationship word represents a relationship between the two content words in the content word pair, the two content words and the relationship word are determined by a knowledge graph or a relationship database;

obtaining search results corresponding to the query;

sorting the search results according to a sorting result of the sorting model for titles of the search results.

4. The method according to claim 3, wherein when the sorting model sorts titles of the search results, the method specifically comprises:

inputting the content word pair, the relationship word of the content word pair and the titles of search results corresponding to the query into the sorting model to obtain the sorting result of the sorting model for titles of the search results.

5. A method of determining a content word pair relationship describing sentence, wherein the method comprises:

performing the method of claim 1 to build a sorting model;

obtaining a query including a relationship triple, wherein the relationship triple includes a content word pair and a relationship word of the content word pair, wherein the relationship word represents a relationship between the two content words in the content word pair, the two content words and the relationship word are determined by a knowledge graph or a relationship database;

obtaining titles of search results corresponding to the query;

using the sorting model to sort the titles, and selecting a title from the titles according to the sorting result as a sentence for describing a relationship of the content word pair.

6. The method according to claim 5, wherein the obtaining titles of search results corresponding to the query comprises:

obtaining a title including the content word pair from the titles of the search results corresponding to the query;

the using the sorting model to sort the titles comprises:

inputting the content word pair, the relationship word of the content word pair and the titles of search results corresponding to the query into the sorting model to obtain the sorting result of the sorting model for titles.

7. The method according to claim 5, wherein the method further comprises:

storing, in the relationship database, the content word pair, the relationship word of the content word pair and the sentence for describing the relationship of the content word pair.

8. A method of determining a content word pair relationship describing sentence, wherein the method comprises:

performing the method of claim 7 to build a relationship database;

determining a relevant content word corresponding to a query including a content word, and a relationship word of the content word and the relevant content word, wherein the relationship word represents a relationship between the two content words in the content word pair, the two content words and the relationship word are determined by a knowledge graph or the relationship database;

querying the relationship database to determine a content word pair formed by the content word and the relevant content word, and a relationship describing sentence corresponding to the relationship word;

displaying the relevant content word, the content word and the relationship describing sentence.

9. The method according to claim 8, wherein the displaying comprises: displaying the relevant content word, the content word and the relationship describing sentence in a preset region of a page of search results corresponding to the query; or displaying the relevant content word and the relationship word in a preset region of a page of search results corresponding to the query, and displaying the relationship describing sentence when a preset event is captured in the preset region.

10. An apparatus, comprising one or more processors;

a memory;

one or more programs stored in the memory and configured to execute the following operation when executed by the one or more processors:

obtaining, from a search log, a query including a relationship triple and a clicked title of a search result corresponding to the query, wherein the relationship triple includes a content word pair and a relationship word of the content word pair, wherein the relationship word represents a relationship between the two content words in the content word pair, and the clicked title is a clicked title comprising the content word pair;

obtaining training data using the obtained query, the clicked title corresponding to the query, and times of click of the clicked title;

using the training data to train a neural network-based sorting model, the sorting model being used to sort sentences according to the sentences' description of a relationship of the content word pair, wherein the trained neural network-based sorting model is configured to sort titles based on an input triple representing a given query, wherein the input triple comprises two content words and a relationship word, which are determined from the given query by a knowledge graph or a relationship database;

wherein the obtaining training data using the obtained query, the clicked title corresponding to the obtained query, and times of click of the clicked title comprises:

if in a plurality of clicked titles corresponding to the obtained query, there exist two titles which are clicked for different times, adding document pairs formed by the obtained query with the two titles respectively to the training data, wherein the neural network-based sorting model comprises at least one neural network which is trained using the training data so that relevancies between a feature vector of the obtained query output by the neural network and respective feature vectors of two titles corresponding to the obtained query are sorted according to the times of click of the two titles under the obtained query, with a sorting loss being estimated and fed back to the neural network to adjust parameters to minimize the sorting loss, wherein the more the relevancy of the feature vectors of the obtained query and the corresponding title is positively relevant to the times of click of the title, the smaller the sorting loss of the title is, wherein the more that a difference between the relevancy of the feature vector of the obtained query output by the neural network and the feature vector of one of the two titles and the relevancy of the feature vector of the obtained query and the feature vector of another of the two titles is positively related to a difference between the times of click of the two titles, the smaller the sorting loss is.

11. The Apparatus according to claim 10, wherein the neural network comprises:
a Convolutional Neural Network, a Recurrent Neural Network, or a Long Short-Term Memory network.

12. An apparatus, comprising
one or more processors;
a memory;
one or more programs stored in the memory and configured to execute the following operation when executed by the one or more processors:
performing the method of claim 1 to build a sorting model;
obtaining a query including a relationship triple, wherein the relationship triple includes a content word pair and a relationship word of the content word pair, wherein the relationship word represents a relationship between the two content words in the content word pair, the two content words and the relationship word are determined by a knowledge graph or a relationship database;
obtaining search results corresponding to the query;
sorting the search results according to a sorting result of the sorting model for titles of the search results.

13. The Apparatus according to claim 12, wherein when the sorting model sorts titles of the search results, the operation specifically comprises:
inputting the content word pair, the relationship word of the content word pair and the titles of search results corresponding to the query into the sorting model to obtain the sorting result of the sorting model for titles of the search results.

14. An apparatus, comprising
one or more processors;
a memory;
one or more programs stored in the memory and configured to execute the following operation when executed by the one or more processors:
performing the method of claim 1 to build a sorting model;
obtaining a query including a relationship triple, wherein the relationship triple includes a content word pair and a relationship word of the content word pair, wherein the relationship word represents a relationship between the two content words in the content word pair, the two content words and the relationship word are determined by a knowledge graph or a relationship database;

obtaining titles of search results corresponding to the query;
using the sorting model to sort the titles, and selecting a title from the titles according to the sorting result as a sentence for describing a relationship of the content word pair.

15. The Apparatus according to claim 14, wherein the operation of obtaining titles of search results corresponding to the query comprises:
obtaining a title including the content word pair from the titles of the search results corresponding to the query;
the operation of using the sorting model to sort the titles comprises:
inputting the content word pair, the relationship word of the content word pair and the titles of search results corresponding to the query into the sorting model to obtain the sorting result of the sorting model for titles.

16. The Apparatus according to claim 14, wherein the operation further comprises:
storing, in the relationship database, the content word pair, the relationship word of the content word pair and the sentence for describing the relationship of the content word pair.

17. An apparatus, comprising
one or more processors;
a memory;
one or more programs stored in the memory and configured to execute the following operation when executed by the one or more processors:
performing the method of claim 7 to build a relationship database;
determining a relevant content word corresponding to a query including a content word, and a relationship word of the content word and the relevant content word, wherein the relationship word represents a relationship between the two content words in the content word pair, the two content words and the relationship word are determined by a knowledge graph or the relationship database;
querying the relationship database to determine a content word pair formed by the content word and the relevant content word, and a relationship describing sentence corresponding to the relationship word;
displaying the relevant content word, the content word and the relationship describing sentence.

18. The Apparatus according to claim 17, wherein the displaying comprises: displaying the relevant content word, the content word and the relationship describing sentence in a preset region of a page of search results corresponding to the query; or
displaying the relevant content word and the relationship word in a preset region of a page of search results corresponding to the query, and displaying the relationship describing sentence when a preset event is captured in the preset region.

19. A non-transitory computer storage medium in which one or more programs are stored, an apparatus being enabled to execute the following operation when said one or more programs are executed by the apparatus:
obtaining, from a search log, a query including a relationship triple and a clicked title of a search result corresponding to the query, wherein the relationship triple includes a content word pair and a relationship word of the content word pair, wherein the relationship word represents a relationship between the two content words in the content word pair, and the clicked title is a clicked title comprising the content word pair;

obtaining training data using the obtained query, the clicked title corresponding to the query, and times of click of the clicked title;

using the training data to train a neural network-based sorting model, the sorting model being used to sort sentences according to the sentences' description of a relationship of the content word pair, wherein the trained neural network-based sorting model is configured to sort titles based on an input triple representing a given query, wherein the input triple comprises two content words and a relationship word, which are determined from the given query by a knowledge graph or a relationship database;

wherein the obtaining training data using the obtained query, the clicked title corresponding to the obtained query, and times of click of the clicked title comprises:

if in a plurality of clicked titles corresponding to the obtained query, there exist two titles which are clicked for different times, adding document pairs formed by the obtained query with the two titles respectively to the training data, wherein the neural network-based sorting model comprises at least one neural network which is trained using the training data so that relevancies between a feature vector of the obtained query output by the neural network and respective feature vectors of two titles corresponding to the obtained query are sorted according to the times of click of the two titles under the obtained query, with a sorting loss being estimated and fed back to the neural network to adjust parameters to minimize the sorting loss, wherein the more the relevancy of the feature vectors of the obtained query and the corresponding title is positively relevant to the times of click of the title, the smaller the sorting loss of the title is, wherein the more that a difference between the relevancy of the feature vector of the obtained query output by the neural network and the feature vector of one of the two titles and the relevancy of the feature vector of the obtained query and the feature vector of another of the two titles is positively related to a difference between the times of click of the two titles, the smaller the sorting loss is.

20. The non-transitory computer storage medium according to claim 19, wherein the neural network comprises: a Convolutional Neural Network, a Recurrent Neural Network, or a Long Short-Term Memory network.

21. A non-transitory computer storage medium in which one or more programs are stored, an apparatus being enabled to execute the following operation when said one or more programs are executed by the apparatus:

performing the method of claim 1 to build a sorting model;

obtaining a query including a relationship triple, wherein the relationship triple includes a content word pair and a relationship word of the content word pair, wherein the relationship word represents a relationship between the two content words in the content word pair, the two content words and the relationship word are determined by a knowledge graph or a relationship database;

obtaining search results corresponding to the query;

sorting the search results according to a sorting result of the sorting model for titles of the search results.

22. The non-transitory computer storage medium according to claim 21, wherein when the sorting model sorts titles of the search results, the operation specifically comprises:

inputting the content word pair, the relationship word of the content word pair and the titles of search results corresponding to the query into the sorting model to obtain the sorting result of the sorting model for titles of the search results.

23. A non-transitory computer storage medium in which one or more programs are stored, an apparatus being enabled to execute the following operation when said one or more programs are executed by the apparatus:

performing the method of claim 1 to build a sorting model;

obtaining a query including a relationship triple, wherein the relationship triple includes a content word pair and a relationship word of the content word pair, wherein the relationship word represents a relationship between the two content words in the content word pair, the two content words and the relationship word are determined by a knowledge graph or a relationship database;

obtaining titles of search results corresponding to the query;

using the sorting model to sort the titles, and selecting a title from the titles according to the sorting result as a sentence for describing a relationship of the content word pair.

24. The non-transitory computer storage medium according to claim 23, wherein the operation of obtaining titles of search results corresponding to the query comprises:

obtaining a title including the content word pair from the titles of the search results corresponding to the query;

the operation of using the sorting model to sort the titles comprises:

inputting the content word pair, the relationship word of the content word pair and the titles of search results corresponding to the query into the sorting model to obtain the sorting result of the sorting model for titles.

25. The non-transitory computer storage medium according to claim 23, wherein the operation further comprises:

storing, in the relationship database, the content word pair, the relationship word of the content word pair and the sentence for describing the relationship of the content word pair.

26. A non-transitory computer storage medium in which one or more programs are stored, an apparatus being enabled to execute the following operation when said one or more programs are executed by the apparatus:

performing the method of claim 10 to build a relationship database;

determining a relevant content word corresponding to a query including a content word, and a relationship word of the content word and the relevant content word, wherein the relationship word represents a relationship between the two content words in the content word pair, the two content words and the relationship word are determined by a knowledge graph or the relationship database;

querying the relationship database to determine a content word pair formed by the content word and the relevant content word, and a relationship describing sentence corresponding to the relationship word;

displaying the relevant content word, the content word and the relationship describing sentence.

27. The non-transitory computer storage medium according to claim 26, wherein the displaying comprises: displaying the relevant content word, the content word and the relationship describing sentence in a preset region of a page of search results corresponding to the query; or displaying the relevant content word and the relationship word in a preset region of a page of search results corresponding to the query, and displaying the relationship describing sentence when a preset event is captured in the preset region.

\* \* \* \* \*